Patented Jan. 23, 1951

2,538,763

UNITED STATES PATENT OFFICE 2,538,763

PHENYLAMINOPROPANDIOLS

Harry M. Crooks, Jr., Mildred C. Rebstock, John Controulis, and Quentin R. Bartz, Detroit, Mich., assignors to Parke, Davis & Company, Detroit, Mich., a corporation of Michigan No Drawing. Application February 12, 1949, Serial No. 76,173

10 Claims. (Cl. 260—570.6)

This application is a continuation-in-part of our copending application Serial No. 15,264, filed March 16, 1948, now U. S. Patent 2,483,884, and the invention relates to new chemical compounds and to chemical methods useful for their synthesis. More particularly, the invention relates to a new class of organic amino diols and their acid addition salts and to methods for obtaining these products. The amino diol compounds of the invention in their free base form can be represented by the formula,

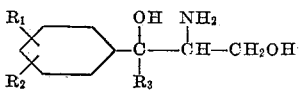

where $R_1$ and $R_2$ are the same or different and represent hydrogen, halogen, lower alkyl and lower alkoxy radicals and $R_3$ is hydrogen or a lower alkyl radical.

It will be appreciated by those skilled in the art that the amino diols of the invention and the starting materials used in their preparation can exist in structural as well as optical isomeric forms. The term "structural" isomer or form as used herein refers to the cis or trans, that is, the planar relationship of the polar groups on the two asymmetric carbon atoms. To differentiate between these two possible diastereoisomers we will subsequently refer to the cis compounds as the "regular" [reg.] series or form and to the trans diastereoisomers as the "pseudo" [ψ] series of form. Such cis compounds are products wherein the two most highly polar of the groups on the asymmetric carbon atoms lie on the same side of the plane of the two carbon atoms. Conversely, the trans or pseudo compounds are those wherein the two most highly polar groups lie on opposite sides of the plane of the two carbon atoms.

Both the regular and pseudo forms exist as racemates of the optically active dextro [d] and levo [l] rotatory isomers as well as in the form of the individual or separated dextro [d] and levo [l] optical isomers.

Because of the difficulty of representing these structural differences in graphic formulae the customary structural formulae will be used in both the specification and claims and a notation placed below or to the side of the formula to designate the particular structural and optical configuration of the compound. Where the formula represents the unresolved mixture of the structural and optical isomers the notation "unresolved" will be used. However, it should be expressly understood that where no notation appears with a structural formula the formula should be interpreted in its generic sense, that is, as representing the [l]—ψ, [d]—ψ, [l]-reg. or [d]-reg. isomers in separated form as well as the [dl]—ψ or [dl]-reg. optical racemates or the total unresolved mixture of structural and optical isomers. Such a formula does not merely represent the unresolved mixture of isomers.

The products of the invention may be prepared by several different methods. One method of preparing these products consists in hydrolyzing an acylated amino diol having the formula,

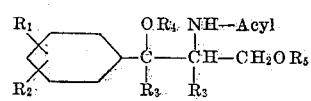

where $R_1$ and $R_2$ are the same or different and represent hydrogen, halogen, lower alkyl or lower alkoxy radicals, $R_3$ is hydrogen or a lower alkyl radical and $R_4$ and $R_5$ are the same or different and represent hydrogen or acyl radicals. The term "acyl" as used herein includes saturated and unsaturated lower aliphatic acyl, halogen substituted lower aliphatic acyl, carboxy substituted lower aliphatic acyl, cyano substituted lower aliphatic acyl, ether substituted lower aliphatic acyl, hydroxy substituted lower aliphatic acyl, ester substituted lower aliphatic acyl, benzoyl, substituted benzoyl, araliphatic acyl, furoyl, pyridinoyl and the like.

In carrying out the hydrolysis acidic or alkaline conditions can be used. However, we prefer to hydrolyze using dilute mineral acid since it is more efficient in bringing about hydrolysis in a shorter time. When acidic hydrolytic conditions are used the phenyl amino diol product is present in the reaction mixture in the form of an acid addition salt and it can either be isolated in this form or it can be neutralized and isolated as the free base.

If desired, the hydrolysis may be carried out in a medium containing a water miscible organic solvent such as methanol, ethanol, dioxane, n-propanol and the like.

The reaction may be effected over a wide temperature range but is preferably carried out at the boiling point of the reaction mixture. Some specific examples of the hydrolytic catalysts or reagents which can be employed are hydrochloric acid, hydrobromic acid, hydriodic acid, sulfuric acid, phosphoric acid, sodium hydroxide, potassium hydroxide, lithium hydroxide, barium hydroxide, sodium carbonate, potassium carbonate and the like.

As stated above, the acid addition salts of the amino diols may be prepared directly by hydrolysis. These salts may also be prepared by reaction of the free base with the corresponding organic or inorganic acid. Some examples of these acid addition salts are the hydrochloride, hydrobromide, hydroiodide, sulfate, sulfamate, oxalate, tartrate, citrate, benzoate, maleate, succinate, acetate and the like.

The amino diol products of the invention can also be produced by reduction of the corresponding nitro diol compound. Such nitro diol compounds have the formula,

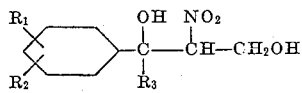

Unresolved where $R_1$, $R_2$ and $R_3$ have the same significance as given above. Due to the lability of the nitro group these nitro diol starting materials always exist in the unresolved state and hence no attempt is made to separate them into their individual structural and optical isomers prior to reduction. The amino diol products obtained by reduction are stable and can be, if desired, separated into their structural isomers by fractional crystallization either after or during the isolation of the amino diol from the reaction mixture. Each of these separated structural isomers of the amino diols can be resolved further, if desired, into their component optical isomers via an optically active acid addition salt of such acids as the optically active camphor sulfonic acids, tartaric acids, mandelic acids, brom-camphor sulfonic acids and the like. Neutralization of the optically active salts after separation by fractional crystallization from water and/or organic solvents such as methanol, ethanol and ethyl acetate yields the desired individual structural and optical isomer of the amino diol free base.

The reduction of the nitro diols is preferably accomplished by catalytic means using catalysts and conditions which do not cause hydrogenolysis of benzyl alcohol. Some of the catalysts which have been found suitable for this purpose are palladium oxide, palladium on carbon and Raney nickel. When the foregoing hydrogenation catalysts are used the hydrogenation can be carried out under hydrogen pressures varying from atmospheric, about 15 lbs. per sq. in., to about 2000 lbs. per sq. in. and at temperatures ranging from about 20 to 50° C. As media for the hydrogenation a variety of different organic solvents, such as acetic acid and lower aliphatic alcohols, may be used.

Another method of effecting this transformation consists in reducing the 1-phenyl-2-nitropropane-1,3-diol compound by chemical means such as by the use of reducing salts or acid-metal combinations. Some of the reducing salts which may be used are stannous chloride, sodium hydrosulfite, ferrous sulfate and the like while iron-acetic acid and zinc-sulfuric acid are examples of the metal-acid reductants. Still another metal-acid combination which has proved advantageous is a nickel-aluminum alloy, such as "Raney nickel catalyst powder," in combination with acetic acid.

The amino diols of the invention and their acid addition salts are valuable intermediates for the preparation of other organic compounds. They are of particular value as intermediates in the preparation of organic compounds possessing antibiotic activity. For example, [1]-ψ-1-p-iodophenyl-2-aminopropane-1,3-diol, one of the products of Example 9, can be converted by dichloroacetylation to [1] - ψ - 1 - p - iodophenyl-2-dichloroacetamidopropane - 1,3 - diol, a product possessing a high degree of antibiotic activity. Similarly, the products of the invention having the pseudo structural form, no substituents in the phenyl ring and a three-carbon side chain can be completely acylated, nitrated, hydrolyzed to the nitrophenyl amino diol, resolved via an optically active acid addition salt, if necessary, to obtain the [1]-ψ-nitrophenyl amino diol and dichloroacetylated to obtain [1]-ψ-1-p-nitrophenyl -2- dichloroacetamidopropane -1,3- diol, a compound possessing an extremely high degree of unique antibiotic activity.

The invention is illustrated by the following examples.

*Example 1*

[a] 20 g. of the sodium salt of 1-phenyl-2-nitropropane-1,3-diol is dissolved in 200 cc. of glacial acetic acid. 0.75 g. of palladium oxide hydrogenation catalyst is added and the mixture shaken with hydrogen under three atmospheres pressure for about twelve hours. The catalyst is removed by filtration, the filtrate concentrated to about one-tenth volume in vacuo and diluted with five volumes of water. The solution is extracted with one volume of ethyl acetate or ether and the extract discarded. The aqueous phase is made alkaline to pH 12 with strong sodium hydroxide solution and extracted with five 100 cc. portions of ethyl acetate. The combined extracts are dried, the ethyl acetate evaporated to obtain the desired unresolved 1-phenyl-2-aminopropane-1,3-diol of formula,

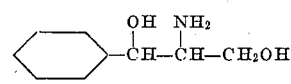

Unresolved

Crystallization of the unresolved 1-phenyl-2-aminopropane-1,3-diol from chloroform yields the [dl]-reg. isomer of 1-phenyl-2-aminopropane-1,3-diol; M. P. 103–4° C. This product has the formula,

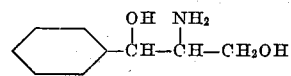

[dl]-Reg. Form

Evaporation of the chloroform filtrate after separation of the [dl]-reg. isomer followed by fractional crystallization of the residue from methanol yields the desired [dl]-ψ-1-phenyl-2-aminopropane-1,3-diol of formula,

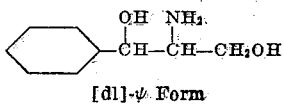

[dl]-ψ Form

[b] A mixture consisting of 5 g. of [dl]-ψ-1-phenyl-2-acetamidopropane-1,3-diol and 100 cc. of 5% hydrochloric acid is refluxed for one hour and then the reaction mixture evaporated to dryness in vacuo. The residual hydrochloride salt of [dl]-ψ-1-phenyl-2-aminopropane-1,3-diol is taken up in a small amount of water, the solution made alkaline to pH 10 with sodium hydroxide solution and extracted with ethyl acetate. The ethyl acetate extract is dried and the ethyl acetate distilled in vacuo to obtain the desired [dl]-ψ-1-phenyl-2-aminopropane-1,3-diol of formula,

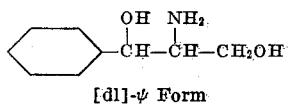

[dl]-ψ Form

By substituting an equivalent amount of [dl]-ψ-1-phenyl-2-benzamidopropane-1,3-diol for the N-acetyl derivative used in the above procedure, one obtains the same product.

[c] 4 g. of [dl]-ψ-1-phenyl-2-acetamido-3-acetoxypropane-1-ol in 25 cc. of 3 N hydrochloric acid is refluxed for about three hours and the reaction mixture evaporated to dryness. The residual hydrochloride salt is taken up in a small amount of water, the solution made alkaline with sodium hydroxide and extracted with ethyl acetate. After drying, the ethyl acetate is evaporated from the extracts in vacuo to obtain the free base of [dl]-ψ-1-phenyl-2-aminopropane-1,3-diol; M. P. 81–3° C. This product has the formula,

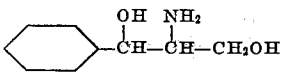

[dl]-ψ Form

[d] 3 g. of the triacetate of [dl]-ψ-1-phenyl-2-aminopropane-1,3-diol is heated with 100 cc. of 5% hydrochloric acid for two hours on a steam bath. The reaction mixture is evaporated to dryness in vacuo, the hydrochloride salt of [dl]-ψ-1-phenyl-2-aminopropane-1,3-diol thus obtained taken up in a small amount of water and the solution made alkaline to pH 10 with sodium hydroxide. The solution is extracted with ethyl acetate, the combined extracts dried and the ethyl acetate distilled in vacuo to obtain the desired [dl]-ψ-1-phenyl-2-aminopropane-1,3-diol of formula,

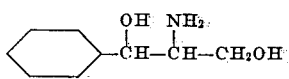

[dl]-ψ Form

If desired, 100 cc. of 5% sulfuric acid can be substituted for the hydrochloric acid used in the above procedure.

[e] 4 g. of [dl]-ψ-1-phenyl-2-aminopropane-1,3-diol is dissolved in about 60 cc. of warm n-butanol containing an equivalent amount of [d]-camphor sulfonic acid. The mixture is cooled and the crystalline [d]-camphor sulfonate salt of [l]-ψ-1-phenyl-2-aminopropane-1,3-diol which separates collected. The corresponding [d]-camphor sulfonate salt of the [d]-ψ-isomer can be recovered, if desired, from the filtrate. The [d]-camphor sulfonate salt of [l]-ψ-1-phenyl-2-aminopropane-1,3-diol is dissolved in a small amount of water containing an excess of sodium hydroxide. The solution is extracted with ethyl acetate, the ethyl acetate extracts dried and the solvent distilled in vacuo. The residue consists of [l]-ψ-1-phenyl-2-aminopropane-1,3-diol which has the formula,

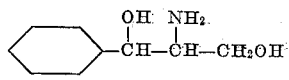

[dl]-ψ Form

Basification of the [d]-camphor sulfonate salt of [d]-ψ-1-phenyl-2-aminopropane-1,3-diol yields the desired [d]-ψ-isomer of the amino diol.

By substituting [dl]-reg.-1-phenyl-2-aminopropane-1,3-diol for the [dl]-ψ-amino diol used in the above procedure one obtains the [d] and [l]-reg. optical isomers of 1-phenyl-2-aminopropane-1,3-diol.

[f] 5 g. of [dl]-reg.-1-phenyl-2-aminopropane-1,3-diol is dissolved in water and treated with an equivalent amount of [d]-tartaric acid. The reaction mixture is evaporated to dryness and the mixture of the [d]-tartaric acid salts of the [d] and [l] forms of reg.-1-phenyl-2-aminopropane-1,3-diol separated by fractional crystallization from absolute ethanol.

The [d]-tartaric acid salt of [d]-reg.-1-phenyl-2-aminopropane-1,3-diol is dissolved in water, the solution made alkaline to pH 10 with sodium hydroxide and extracted with ethyl acetate. The extracts are dried and the ethyl acetate distilled to obtain the free base of [d]-reg.-1-phenyl-2-aminopropane-1,3-diol of formula,

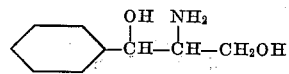

[d]-Reg. form

In a similar manner the free base of [l]-reg.-1-phenyl-2-aminopropane-1,3-diol may be obtained by decomposing the corresponding [d]-tartaric acid salt with sodium hydroxide.

[g] 1 g. of [l]-ψ-1-phenyl-2-aminopropane-1,3-diol dissolved in a small amount of isopropanol is added to a warm isopropanol solution containing one equivalent of oxalic acid monohydrate. The resulting mixture is evaporated to dryness in vacuo and the crystalline acid oxalate salt of [l]-ψ-1-phenyl-2-aminopropane-1,3-diol purified by recrystallization from isopropanol.

0.5 g. of [l]-ψ-1-phenyl-2-aminopropane-1,3-diol is added to an aqueous solution containing one equivalent of citric acid and the mixture evaporated to dryness in vacuo. The citrate salt of [l]-ψ-1-phenyl-2-aminopropane-1,3-diol thus obtained is purified by recrystallization from absolute alcohol.

0.5 g. of [dl]-ψ-1-phenyl-2-aminopropane-1,3-diol is dissolved in a dilute solution of acetic acid and the resulting solution evaporated to dryness in vacuo to obtain the acetate salt of [dl]-ψ-1-phenyl-2-aminopropane-1,3-diol.

1 g. of [dl]-reg.-1-phenyl-2-aminopropane-1,3-diol is dissolved in a small amount of alcohol and the resulting solution added to a methanol solution containing one equivalent of racemic tartaric acid. The racemic tartrate salt of [dl]- reg.-1-phenyl-2-aminopropane-1,3-diol which crystallizes from the solution is collected and purified by recrystallization from absolute ethanol.

2 g. of [dl]-ψ-1-phenyl-2-aminopropane-1,3-diol and an equal amount of [+][d]-mandelic acid is dissolved in 80 cc. of boiling absolute ethanol and the solution allowed to cool slowly. The [+][d]-mandelate salt of [l]-ψ-1-phenyl-2-aminopropane-1,3-diol which separates from the solution first is collected and purified by recrystallization from absolute ethanol. The [+][d]-mandelate salt of the [d]-ψ-isomer can be recovered from the filtrates.

Example 2

[a] 18 g. of the sodium salt of 1-o-methylphenyl-2-nitropropane-1,3-diol is dissolved in 175 cc. of glacial acetic acid, 0.75 g. of palladium oxide hydrogenation catalyst added and the mixture hydrogenated under three atmospheres' pressure of hydrogen for about twelve hours. The catalyst is removed by filtration, the filtrate concentrated to a small volume in vacuo and then the residue diluted with five volumes of water. The solution is extracted with one volume of ethyl acetate or ether and the extract discarded. The aqueous phase is made alkaline to pH 12 with strong sodium hydroxide solution and extracted with five volumes of ethyl acetate. The ethyl acetate extracts are combined, dried and the ethyl acetate evaporated in vacuo. The residue which consists of a mixture of the [dl]-reg. and [dl]-ψ-1-o-methylphenyl-2-aminopropane-1,3-diol is taken up in and crystallized from chloroform to obtain the [dl]-reg.-1-o-methylphenyl-2-aminopropane-1,3-diol in crystalline form. Its formula is,

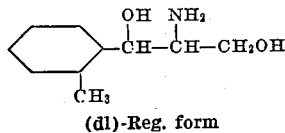

(dl)-Reg. form

The chloroform filtrate from which the [dl]-reg.-1-o-methylphenyl-2-aminopropane-1,3-diol has been removed is evaporated in vacuo to obtain the crude [dl]-ψ-1-o-methylphenyl-2-aminopropane-1,3-diol of formula,

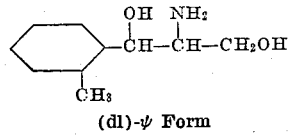

(dl)-ψ Form

[b] 4 g. of [dl]-ψ-1-o-methylphenyl-2-benzamidopropane-1,3-diol is heated with a mixture consisting of 50 cc. of ethanol and 50 cc. of 10% hydrochloric acid for about two hours. The reaction mixture is evaporated to dryness in vacuo, treated with about 125 cc. of water and the solution made alkaline to pH 10 with sodium hydroxide. The mixture is extracted with ethyl acetate, the ethyl acetate extract washed with water, dried and evaporated to dryness in vacuo. The product thus obtained is [dl]-ψ-1-o-methylphenyl-2-aminopropane-1,3-diol of formula,

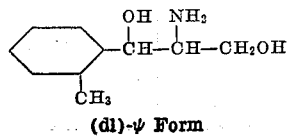

(dl)-ψ Form

[c] 5 g. of [dl]-reg.-1-o-methylphenyl-2-dichloroacetamido-3-benzoyloxypropane-1-ol is heated under reflux with 100 cc. of 5% hydrobromic acid for about four hours. The reaction mixture is evaporated to dryness in vacuo, the residue treated with 100 cc. of water and the resulting mixture made alkaline to pH 10 with sodium hydroxide. The solution is extracted with ethyl acetate, the ethyl acetate extract washed with water, dried and the ethyl acetate distilled in vacuo to obtain the desired [dl]-reg.-1-o-methylphenyl-2-aminopropane-1,3-diol of formula,

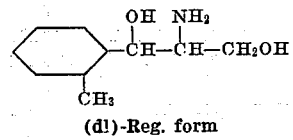

(dl)-Reg. form

Example 3

[a] 20 g. of the sodium salt of 1-m-methoxyphenyl-2-nitropropane-1,3-diol is dissolved in 200 cc. of glacial acetic acid. 0.75 g. of palladium oxide hydrogenation catalyst is added and the mixture hydrogenated under three atmospheres pressure of hydrogen for about twelve hours. The catalyst is removed by filtration, the filtrate concentrated in vacuo to about one-tenth of its original volume and the residue diluted with five volumes of water. The solution is extracted with ethyl acetate and the extract discarded. The aqueous solution is made alkaline to pH 12 with strong sodium hydroxide, extracted with ethyl acetate and the combined extracts dried. The ethyl acetate is removed by distillation in vacuo to obtain the unresolved 1-m-methoxyphenyl-2-aminopropane-1,3-diol of formula,

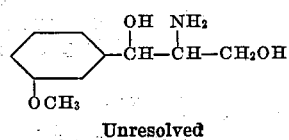

Unresolved

Crystallization of the unresolved 1-m-methoxyphenyl-2-aminopropane-1,3-diol from chloroform yields the [dl]-reg.-1-m-methoxyphenyl-2-aminopropane-1,3-diol in crystalline from. The formula of this product is,

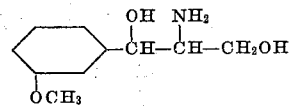

[dl]-Reg. form

F., and consisting of an aqueous solution contain-

The corresponding [dl]-ψ-1-m-methoxyphenyl-2-aminopropane-1,3-diol which remains dissolved in the chloroform solution from the crystallization of the [dl]-reg. isomer is recovered by evaporation of the solution in vacuo.

[b] 5 g. of the tri-phenylacetyl derivative of [dl]-ψ-1-m-methoxyphenyl-2-aminopropane-1,3-diol is heated under reflux with a mixture consisting of 50 cc. of 10% hydrochloric acid and 50 cc. of ethanol for three hours. The reaction mixture is evaporated to dryness in vacuo, the residue treated with 100 cc. of water and the mixture made alkaline to pH 10 with sodium hydroxide solution. The solution is extracted with ethyl acetate, the ethyl acetate extract washed with water, dried and the ethyl acetate distilled in vacuo to obtain the desired [dl] - ψ - 1 - m - methoxyphenyl - 2 - aminopropane-1,3-diol of formula,

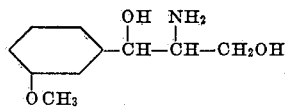

(dl)-ψ Form

*Example 4*

[a] A mixture consisting of 20 g. of the sodium salt of 1-[3',4'-dimethylphenyl]-2-nitropropane-1,3-diol, 175 cc. of glacial acetic acid and 0.75 g. of palladium oxide hydrogenation catalyst is shaken under three atmospheres pressure of hydrogen for about fifteen hours. The catalyst is removed by filtration and the filtrate concentrated to about one-tenth volume in vacuo. The residue is diluted with five volumes of water, the solution extracted with one volume of ethyl acetate and the extract discarded. The aqueous solution is made alkaline to about pH 12 with sodium hydroxide, extracted with ethyl acetate and the combined extracts dried. The ethyl acetate is evaporated in vacuo to obtain the unresolved 1-[3',4'-dimethylphenyl]-2-aminopropane-1,3-diol of formula,

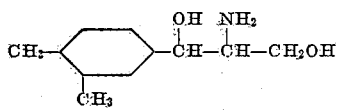

Unresolved

The unresolved 1-[3',4'-dimethylphenyl]-2-aminopropane-1,3-diol is taken up in and crystallized from chloroform to obtain the desired [dl]-reg.-1-[3',4'-dimethylphenyl]-2-aminopropane-1,3-diol of formula,

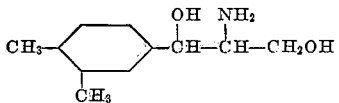

[dl]-Reg. form

Evaporation of the chloroform filtrate after separation of the [dl]-reg. isomer followed by crystallization of the residue from ethyl acetate-ligroin mixture yields the desired [dl]-ψ-1-[3',4'-dimethylphenyl]-2-aminopropane-1,3-diol of formula,

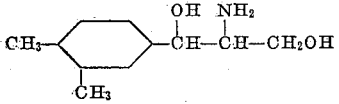

[dl]-ψ Form

[b] 5 g. of [dl]-ψ-1-[3',4'-dimethylphenyl]-2-aminopropane-1,3-diol is dissolved in a small amount of warm n-butanol containing an equivalent amount of [d]-brom-camphor sulfonic acid and the mixture cooled. The [d]-brom-camphor sulfonate salt of [l] - ψ - 1 - [3' - 4' - dimethyl-phenyl]-2-aminopropane-1,3- diol which separates from the solution first is collected, dissolved in a small amount of water and treated with an excess of sodium hydroxide. The solution is extracted with ethyl acetate, the ethyl acetate extracts dried and the solvent distilled in vacuo to obtain the desired [l]-ψ-1-[3',4'-dimethylphenyl]-2-aminopropane-1,3-diol of formula,

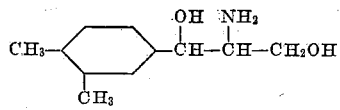

[l]-ψ Form

The [d]-brom-camphor sulfonate salt of [d]-ψ-1 - [3',4'dimethylphenyl] - 2 - aminopropane - 1,3-diol can be recovered from the filtrates and neutralized with sodium hydroxide to obtain the desired [d]-ψ-1-[3',4'-dimethylphenyl]-2-aminopropane-1,3-diol of formula,

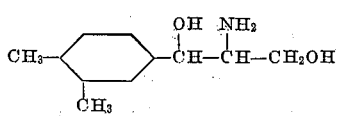

[d]-ψ Form

[c] 4 g. of [dl]-reg.-1-[3',4'-dimethylphenyl]-2-propionamidopropane-1,3-diol in 100 cc. of 5% hydrochloric acid is refluxed for one hour and the reaction mixture evaporated to dryness in vacuo. The residue which consists of the hydrochloride salt of [dl]-reg.-1-[3',4'-dimethylphenyl]-2-aminopropane-1,3-diol is taken up in water, the solution made alkaline with sodium hydroxide and extracted with ethyl acetate. The ethyl acetate extract is dried and the ethyl acetate distilled to obtain the desired [dl]-reg.-1-[3',4'-dimethylphenyl]-2-aminopropane-1,3-diol of formula,

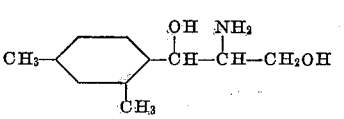

[dl]-Reg. form

*Example 5*

[a] 20 g. of the sodium salt of 2-nitro-3-phenylbutane-1,3-diol is dissolved in 200 cc. of glacial acetic acid, 0.75 g. of palladium oxide hydrogenation catalyst added to the solution and the mixture shaken under three atmospheres pressure of hydrogen for about fifteen hours. The catalyst is removed by filtration and the filtrate concentrated to one-tenth volume in vacuo. The residue is diluted with five volumes of water, the solution extracted with one volume of ethyl acetate and the extract discarded. The aqueous solution is made alkaline with sodium hydroxide [pH 12] and extracted with ethyl acetate. After drying, the ethyl acetate is evaporated in vacuo from the combined extracts to obtain the desired 2-amino-3-phenylbutane-1,3-diol of formula,

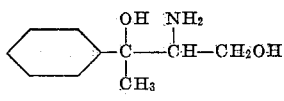

Unresolved

If desired, this product can be separated into its regular and pseudo structural forms by crystallization from chloroform. The [dl]-reg.-2-amino-3-phenylbutane-1,3-diol is the insoluble isomer.

[b] 3 g. of [dl]-reg.-2-amino-3-nitrophenylbutane-1,3-diol is added to an absolute alcohol solution containing an equivalent amount of [d]-tartaric acid. The reaction mixture is evaporated to dryness in vacuo and the residue fractionally crystallized from absolute alcohol to obtain the [d]-tartaric acid salts of the individual [d] and [l]-reg. isomers of 2-amino-3-phenylbutane-1,3-diol. The [d]-tartaric acid salt of the [d]-reg. isomer which is the first to crystallize from the mixture is dissolved in water containing an excess of sodium hydroxide. The solution is extracted with ethyl acetate, the extract dried and the ethyl acetate distilled to obtain the desired [d]-reg.-2-amino-3-phenylbutane-1,3-diol of formula,

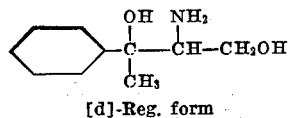

[d]-Reg. form

*Example 6*

[a] 50 g. of stannous oxide is added to 26 g. of the sodium salt of 1-o-chlorophenyl-2-nitropropane-1,3-diol in 500 cc. of 90% acetic acid. The suspension is stirred at 45 to 55° C. for twenty-four hours at the end of which time the stannous oxide has for the most part dissolved. The reaction mixture is evaporated to dryness in vacuo, the residue dissolved in a small amount of water and the solution made alkaline to pH 11 with sodium hydroxide. The mixture is filtered, the insoluble precipitate extracted about five times with ethyl acetate and the ethyl acetate extracts used to extract the clear filtrate. The ethyl acetate extracts are dried and the ethyl acetate distilled to obtain the unresolved 1-o-chlorophenyl-2-aminopropane-1,3-diol as an oil. This product has the formula,

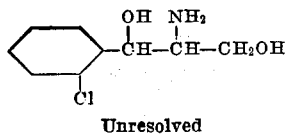

Unresolved

Crystallization of the oily unresolved product from chloroform yields the crystalline [dl]-reg.-1-o-chlorophenyl-2-aminopropane - 1,3 - diol, the chloroform soluble fraction being predominantly the [dl]-ψ isomer.

Other salts of stannous tin, for example, 70 g. of stannous chloride may be used in place of the stannous oxide as the reducing agent.

[b] 5 g. of [dl]-ψ-1-o-chlorophenyl-2-acetamidopropane-1,3-diol is heated under reflux with 100 cc. of 5% hydrochloric acid for one hour. The reaction mixture is evaporated to dryness in vacuo, the residue taken up in a small amount of water and the solution made alkaline to pH 11 with sodium hydroxide. The solution is extracted with ethyl acetate, the ethyl acetate extracts dried and the ethyl acetate distilled to obtain the desired [dl]-ψ-1-o-chlorophenyl-2-aminopropane-1,3-diol of formula,

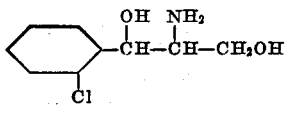

[dl]-ψ Form

*Example 7*

3 g. of palladium oxide hydrogenation catalyst is added to 79 g. of the sodium salt of 1-p-methoxyphenyl-2-nitropropane-1 3-diol in 350 cc. of glacial acetic acid and the resulting mixture shaken under three atmospheres pressure of hydrogen for sixteen hours at 25° C. The catalyst is removed by filtration, the filtrate evaporated to dryness in vacuo and the residue taken up in water. The mixture is extracted with ether, the ether extract discarded and the aqueous phase made alkaline to pH 10 with sodium hydroxide. The solution is extracted with five portions of ethyl acetate, the ethyl acetate extract dried and the ethyl acetate distilled to obtain the desired unresolved 1-p-methoxyphenyl-2-aminopropane-1,3-diol of formula,

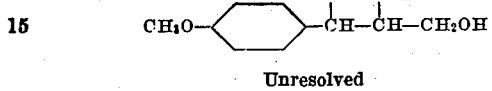

Unresolved

Crystallization of the unresolved 1-p-methoxyphenyl-2-aminopropane-1,3-diol from chloroform yields the chloroform-insoluble, crystalline [dl]-reg.-1-p-methoxyphenyl-2 - aminopropane-1,3-diol. The chloroform soluble [dl]-ψ-1-p-methoxyphenyl-2-aminopropane-1,3-diol of formula,

[dl]-ψ Form is recovered from the chloroform mother liquors by evaporation of the solvent. Purification of this product may be accomplished by further crystallization from chloroform to remove any contaminating [dl]-reg. isomer. Purification can also be carried out by converting the crude [dl]-ψ product to the O,N-diacetate by treatment with acetic anhydride at 70° C. for fifteen minutes, recrystallizing the diacetate from ethanol or ethyl acetate to obtain the pure [dl]-ψ diacetate and hydrolyzing the purified diacetate to the free amino diol with either alkali or acid.

*Example 8*

20 g. of the potassium salt of 2-nitro-3-p-ethylphenyl-butane-1,3-diol in 150 cc. of glacial acetic acid is shaken with 1 g. of palladium oxide hydrogenation catalyst under three atmospheres pressure of hydrogen for fifteen hours at 25° C. The catalyst is removed by filtration, the filtrate evaporated to dryness in vacuo and the residue taken up in water. The mixture is extracted with ether, the ether extract discarded and the solution made alkaline to pH 10 with sodium hydroxide. The solution is extracted with ethyl acetate, the extract dried and the ethyl acetate distilled to obtain the desired unresolved 2-amino-3-p-ethylphenylbutane-1,3-diol of formula,

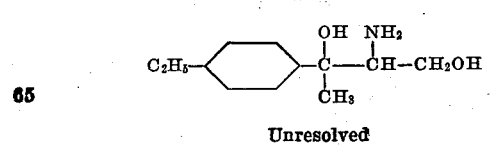

Unresolved

Crystallization of the unresolved 2-amino-3-p-ethylphenylbutane-1,3-diol from chloroform yields as the chloroform insoluble crystalline fraction the [dl]-reg. isomer of 2-amino-3-p-ethylphenylbutane-1,3-diol. Evaporation of the chloroform mother liquors yields the corresponding crude [dl]-ψ isomer.

Example 9

[a] 5 g. of [dl]-ψ-1-p-iodophenyl-2-acetamidopropane-1,3-diol is heated under reflux with 100 cc. of 5% hydrochloric acid for one hour. The reaction mixture is evaporated to dryness in vacuo and the residual hydrochloride salt of [dl]-ψ-1-p-iodophenyl-2-aminopropane-1,3-diol taken up in water and the solution made alkaline to pH 10 with sodium hydroxide. The solution is extracted with ethyl acetate, the ethyl acetate extracts washed with water, dried and the ethyl acetate distilled in vacuo to obtain the desired free base of [dl]-ψ-1-p-iodophenyl-2-aminopropane-1,3-diol of formula,

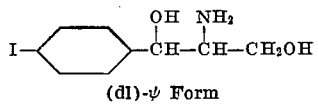

(dl)-ψ Form

[b] 3 g. of [dl]-ψ-1-p-iodophenyl-2-aminopropane-1,3-diol dissolved in a small amount of absolute ethanol is added to an absolute ethanol solution containing a slight excess of [d]-tartaric acid. The solution is concentrated to the point of crystallization in vacuo, chilled and the [d]-tartaric acid salt of [l]-ψ-1-p-iodophenyl-2-aminopropane-1,3-diol which separates collected. Fractional crystallization of the mother liquors yields the [d]-tartaric acid salt of the [d]-ψ isomer together with an additional quantity of the [d]-tartaric acid salt of the [l]-ψ isomer. The [d]-tartaric acid salt of [l]-ψ-1-p-iodophenyl-2-aminopropane-1,3-diol is dissolved in a small amount of water, the solution made alkaline to pH 10 with sodium hydroxide and extracted with ethyl acetate. The ethyl acetate extract is washed with water, dried and the ethyl acetate distilled to obtain the desired [l]-ψ-1-p-iodophenyl-2-aminopropane-1,3-diol of formula,

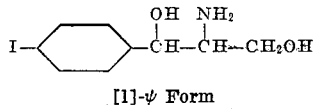

[l]-ψ Form

Similarly, neutralization of the [d]-tartaric acid salt of the [d]-ψ isomer yields [d]-ψ-1-p-iodophenyl-2-aminopropane-1,3-diol.

Example 10

5 g. of [dl]-reg.-1-p-ethoxyphenyl-2-benzamido-3-benzoyloxypropane-1-ol is heated under reflux with a mixture consisting of 50 cc. of ethanol and 50 cc. of 10% hydrobromic acid for three hours. The reaction mixture is evaporated to dryness in vacuo, the residue taken up in water and the solution made alkaline to pH 10 with sodium hydroxide. The solution is extracted with ethyl acetate, the ethyl acetate extract washed with water, dried and the ethyl acetate distilled to obtain the desired [dl]-reg.-1-p-ethoxyphenyl-2-aminopropane-1,3-diol of formula,

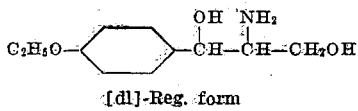

[dl]-Reg. form

Example 11

1.5 g. of palladium oxide hydrogenation catalyst is added to 20 g. of the sodium salt of 1-o-methoxy-p-methylphenyl-2-nitropropane-1,3-diol in 125 cc. of glacial acetic acid and the resulting mixture shaken under three atmospheres of hydrogen for fifteen hours at 25° C. The catalyst is removed by filtration, the filtrate evaporated to dryness in vacuo and the residue taken up in water. The solution is extracted with ether, the ether extract discarded and the aqueous phase made alkaline to pH 10 with sodium hydroxide. The solution is extracted with ethyl acetate, the ethyl acetate extract washed with water, dried and the ethyl acetate distilled in vacuo to obtain the unresolved 1-o-methoxy-p-methylphenyl-2-aminopropane-1,3-diol of formula,

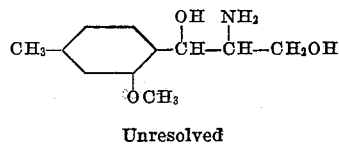

Unresolved

Crystallization of the unresolved product obtained above from chloroform yields as a crystalline fraction the [dl]-reg.-1-o-methoxy-p-methylphenyl-2-aminopropane-1,3-diol. The corresponding [dl]-ψ isomer is obtained by evaporation of the chloroform mother liquors.

Example 12

157 g. of zinc dust is added to a mixture consisting of 87 g. of the sodium salt of 1-phenyl-2-nitropropane-1,3-diol, 355 cc. of glacial acetic acid, 250 cc. of ethanol and 400 cc. of water over a period of 45 minutes and at a temperature of 65-75° C. The reaction mixture is heated for five and one-half hours, extracted with ether and the ether extract discarded. The aqueous phase is made alkaline with sodium hydroxide to pH 10 and extracted with five portions of ethyl acetate. The ethyl acetate extract is washed with water, dried and evaporated in vacuo to obtain the desired unresolved 1-phenyl-2-aminopropane-1,3-diol of formula,

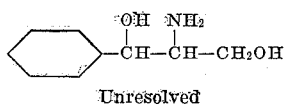

Unresolved

In the foregoing examples we have employed certain nitro diols and acylated amino diols as starting materials. These starting materials can be prepared in a number of different ways. One of the general methods which can be used to prepare the unresolved nitro diols consists in condensing an aromatic aldehyde or ketone with β-nitroethanol in the presence of an alkaline condensation catalyst as shown in the following equation.

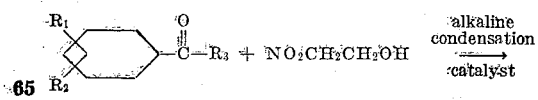

Unresolved where $R_1$, $R_2$ and $R_3$ have the same significance as given above. The acylated amino diol starting materials can be prepared by the general method shown in the following diagram.

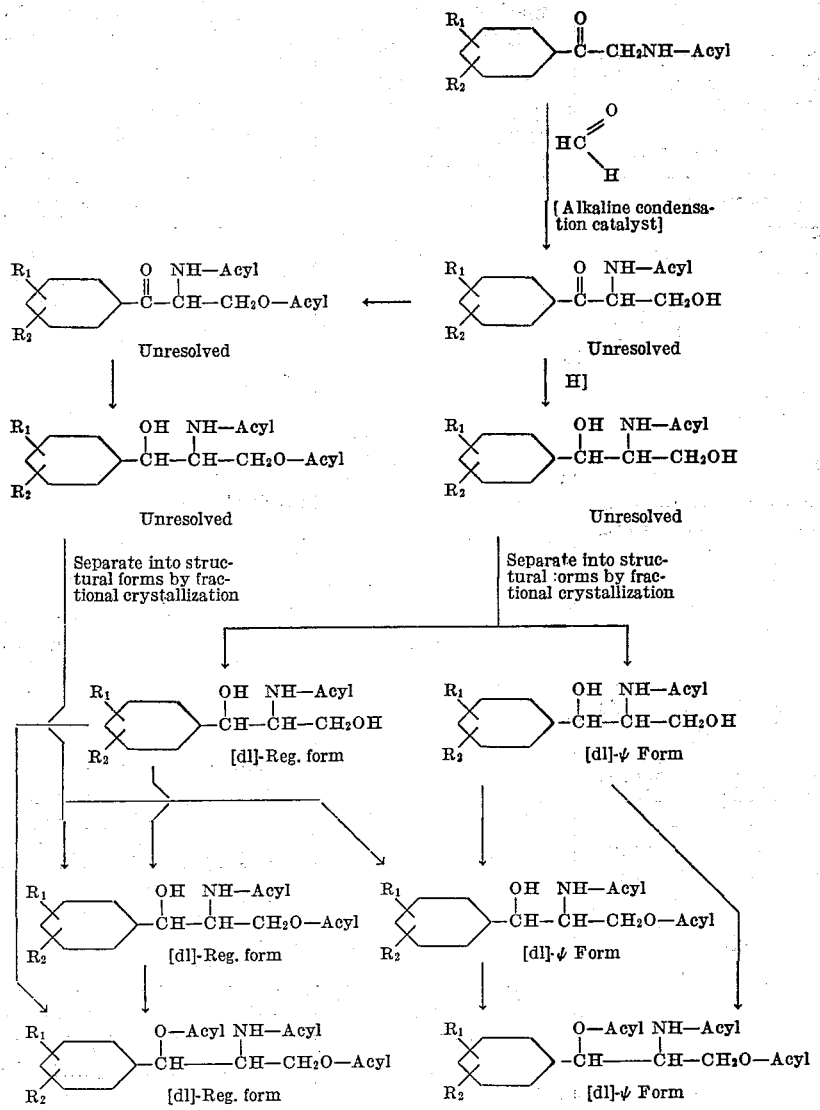

where $R_1$ and $R_2$ have the same significance as given above.

The following examples serve to illustrate the application of these general methods to the preparation of some of the specific starting materials used in the foregoing examples.

Example 13

1.1 g. of sodium is dissolved in 20 cc. of methanol and the resulting solution added to a solution of 5 g. of benzaldehyde and 4.5 g. of β-nitroethanol in 20 cc. of methanol. After standing at room temperature for a short time the gel which forms on the mixing of the reactants changes to a white insoluble powder. The precipitate is collected, washed with methanol and ether and then dried. The product thus produced is the sodium salt of 1-phenyl-2-nitropropane-1,3-diol. If desired, the free nitro-diol having the formula,

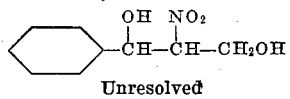

Unresolved can be obtained by acidification of the salt.

Example 14

2.2 g. of sodium dissolved in 40 cc. of methanol is added to a solution of 12 g. of o-methyl benzaldehyde and 9 g. of β-nitroethanol in 40 cc. of methanol. The reaction mixture is allowed to stand at room temperature for a short time and then the white insoluble sodium salt of 1-o-methylphenyl-2-nitropropane-1,3-diol removed by filtration, washed with ether and dried. Acidification of this sodium salt produces the corresponding free nitro compound, 1-o-methylphenyl-2-nitropropane-1,3-diol, which has the formula,

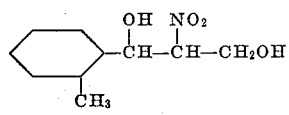

Unresolved

Example 15

16.2 g. of sodium is dissolved in 300 cc. of methanol and the solution added to a mixture consisting of 96 g. of anisaldehyde and 65 g. of β-nitroethanol in 250 cc. of methanol at 5° C. The reaction mixture is allowed to stand for two hours and then the white insoluble sodium salt of 1-p-methoxyphenyl-2-nitropropane-1,3-diol collected, washed with ether and dried. Acidification of this salt produces the free nitro compound, 1-p-methoxyphenyl-2-nitropropane-1,3-diol of formula,

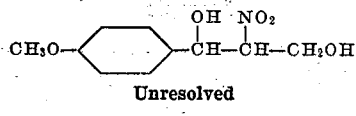

Unresolved

Example 16

The nitro diol starting materials having the formula,

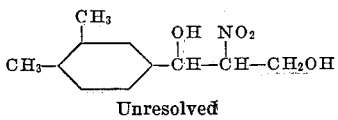

Unresolved can be prepared by starting with 3,4-dimethylbenzaldehyde and β-nitroethanol and following the procedures described in Examples 13, 14 and 15.

Example 17

The nitro diol compounds used as starting materials in the preparation of the amino diols having the general formula,

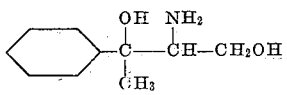

are prepared by starting with acetophenone and β-nitroethanol and following the procedures described in Examples 13, 14 and 15.

Example 18

The nitro diol products used as starting materials having the formula,

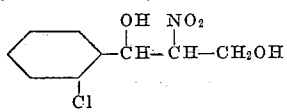

Unresolved can be prepared from o-chlorobenzaldehyde and β-nitroethanol using the procedures described in Examples 13, 14 and 15.

Example 19

A mixture consisting of 48 g. of ω-benzoylaminoacetophenone, 7.2 g. of paraformaldehyde and 0.2 g. of potassium carbonate in 300 cc. of methanol is allowed to stand at room temperature for eighteen minutes. The reaction mixture is added to one liter of ice water and the gummy solid which separates collected and washed with water. The crude α-benzamido-β-hydroxypropiophenone,

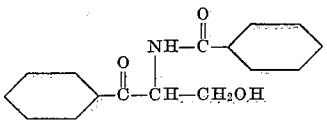

thus obtained is dissolved in 400 cc. of ethanol. 5 g. of Raney nickel is added to the solution and the mixture shaken with gaseous hydrogen under about 50 lbs. per sq. in. pressure for three to four hours at room temperature. The catalyst is removed by filtration and the filtrate heated to boiling and mixed with an equal volume of hot water. After allowing the cool solution containing the desired 1-phenyl-2-benzamidopropane-1,3-diol to stand overnight at 0° C., the crystals which have separated from the solution are collected. This crystalline product is the pseudo or trans structural form of the desired benzamido diol, [dl]-ψ-1-phenyl-2-benzamidopropane-1,3-diol. The formula of this product which melts at 166–7° C. after recrystallization from ethanol is,

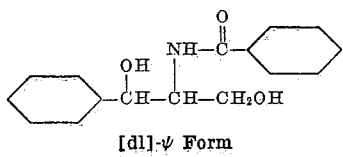

[dl]-ψ Form

The filtrate from the separation of the [dl]-ψ form of the product is evaporated to dryness in vacuo and the crude reg. or cis structural form of the benzamido diol purified by recrystallization from methanol. Its formula is,

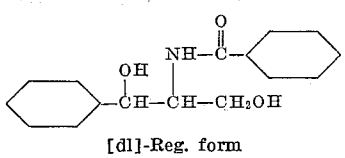

[dl]-Reg. form 8 g. of α-benzamido-β-hydroxypropiophenone is heated at about 75° C. for one-half hour with 20 cc. of acetic anhydride containing a small amount of concentrated sulfuric acid and then the reaction mixture evaporated to dryness in vacuo. The residual crude α-benzamido-β-acetoxypropiophenone is washed with ice water and purified by recrystallization from methanol or ethanol. Its formula is:

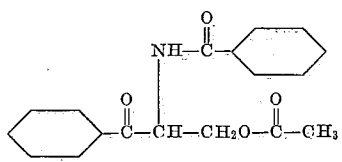

A mixture consisting of 10 g. of α-benzamido-β-acetoxypropiophenone, 0.3 g. of Raney nickel hydrogenation catalyst and 150 cc. of methanol is shaken at 30° C. with gaseous hydrogen under a pressure of about 60 lbs. per sq. in. until the theoretical amount of hydrogen has been absorbed. The reaction mixture is concentrated to a volume of about 80 cc. in vacuo, cooled and the catalyst and insoluble organic material removed by filtration. The solid is extracted with boiling alcohol, the extracts cooled and the crude [dl]-ψ-1-phenyl-2-benzamido-3-acetoxypropane-1-ol collected. This product which has the formula,

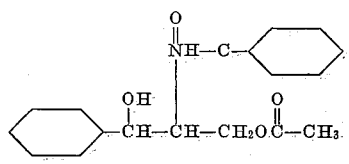

[dl]-ψ Form can be purified further if desired by recrystallization from alcohol.

The corresponding [dl]-reg. isomer can be obtained from the filtrate of the reaction mixture by evaporation of the methanol. The pure isomer is obtained by recrystallization of the crude material from alcohol-water mixtures.

3 g. of [dl]-ψ-1-phenyl-2-benzamidopropane-1,3-diol is heated with 10 cc. of acetic anhydride at 70° C. for fifteen minutes and then the reaction mixture is evaporated to dryness in vacuo. Recrystallization of the residue from ethanol yields the desired [dl]-ψ-1-phenyl-2-benzamido-3-acetoxypropane-1-ol in crystalline form. The formula of this product is,

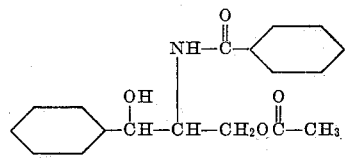

[dl]-ψ Form 2 g. of [dl]-ψ-1-phenyl-2-benzamidopropane-1,3-diol is added to a mixture composed of 4 cc. of acetic anhydride and 4 cc. of dry pyridine and the resulting mixture heated at 100° C. for about one-half hour. The reaction mixture is evaporated to dryness in vacuo and the residue crystallized from methanol to obtain the desired [dl] - ψ - 1 - phenyl - 2 - benzamido-1,3-diacetoxypropane of formula,

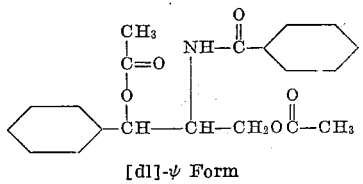

[dl]-ψ Form

If desired, an equivalent amount of [dl]-ψ-1-phenyl-2-benzamido-3-acetoxypropane-1-ol can be substituted for the N-benzoyl derivative used in the above procedure.

*Example 20*

0.2 g. of sodium bicarbonate is added to a solution of 17.7 g. of ω-acetylaminoacetophenone and 6 g. of paraformaldehyde in 300 cc. of methanol and the resulting mixture heated at 45 to 50° C. for about one-half hour. The reaction mixture is poured into 800 cc. of ice water and the crude α-acetamido-β-hydroxypropiophenone which separates collected and washed with water. If desired, this product can be purified by recrystallization from methanol. Its formula is,

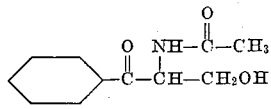

3 g. of Raney nickel hydrogenation catalyst is added to a solution of 15 g. of α-acetamido-β-hydroxypropiophenone in 200 cc. of ethanol and the mixture shaken with gaseous hydrogen under a pressure of about 60 lbs. per sq. in. at 30° C. until one mol of hydrogen has been absorbed. The catalyst is removed by filtration, the filtrate containing the desired 1-phenyl-2-acetamidopropane-1,3-diol heated to boiling and treated with slightly more than an equal volume of hot water. After standing at 0° C. for about twenty-four hours, the crystalline [dl]-ψ-1-phenyl-2-acetamidopropane-1,3-diol is collected and purified by recrystallization from methanol; M. P. 132–3° C. This product has the formula,

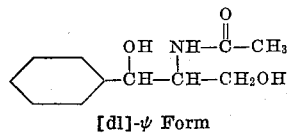

[dl]-ψ Form

The filtrate from the separation of the [dl]-ψ isomer is evaporated to dryness in vacuo and the residue which consists principally of the [dl]-reg. isomer purified by fractional crystallization from ethanol or ethanol-water mixtures to obtain the pure [dl]-reg.-1-phenyl-2-acetamidopropane-1,3-diol. The formula of this product is the same as that of the [dl]-ψ isomer except that this compound has a cis structural configuration.

A mixture consisting of 5 g. of α-acetamido-β-hydroxypropiophenone and 10 cc. of acetic anhydride is warmed to 40° C. and one drop of concentrated sulfuric acid added to the solution. The mixture is allowed to stand for one-half hour and then is evaporated to dryness in vacuo.

The residue which consists of α-acetamido-β-acetoxypropiophenone of formula,

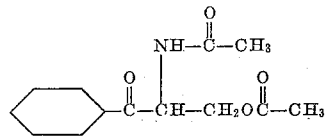

is washed with water and purified by recrystallization from ethanol.

A mixture consisting of 20 g. of α-acetamido-β-acetoxypropiophenone, 0.5 g. of Raney nickel hydrogenation catalyst and 200 cc. of ethanol is shaken at 25° C. with gaseous hydrogen under a pressure of about 50 lbs. per sq. in. until one mol of hydrogen has been absorbed. The reaction mixture is chilled and the solid removed by filtration. The solid which consists of a mixture of [dl]-ψ-1-phenyl-2-acetamido-3-acetoxypropane-1-ol and the hydrogenation catalyst is extracted with boiling ethanol, the extracts cooled and the [dl]-ψ-1-phenyl-2-acetamido-3-acetoxypropane-1-ol which separates collected. This compound which has the formula,

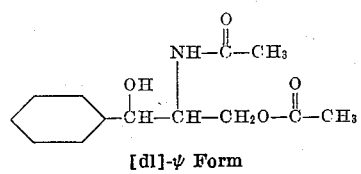

[dl]-ψ Form melts at 167–8° C. when pure.

2 g. of [dl]-ψ-1-phenyl-2-acetamido-3-acetoxypropane-1-ol is added to a mixture consisting of 4 cc. of acetic anhydride and 4 cc. of dry pyridine and the resulting mixture heated at 100° C. for about one-half hour. The reaction mixture is evaporated to dryness in vacuo and the residue crystallized from methanol to obtain the pure triacetate of [dl]-ψ-1-phenyl-2-aminopropane-1,3-diol.

*Example 21*

A mixture consisting of 25.3 g. of ω-benzoylamino-2-methylacetophenone, 6 g. of paraformaldehyde and 0.3 g. of pyridine in 300 cc. of ethanol is warmed at 35° C. for one-half hour and then poured into 800 cc. of ice water. The crude α-benzamido-β-hydroxy - 2 - methylpropiophenone is collected, washed with water and purified by recrystallization from methanol. The formula of this product is:

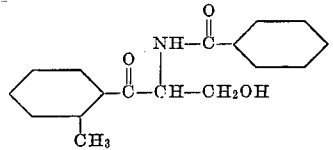

0.5 g. of palladium oxide hydrogenation catalyst is added to a solution of 20 g. of α-benzamido-β-hydroxy-2-methylpropiophenone in 300 cc. of ethanol and the mixture shaken at room temperature with gaseous hydrogen under a pressure of about 50 lbs. per sq. in. until one mol of hydrogen has been absorbed. The catalyst is removed by filtration, the filtrate containing the desired 1 - [2' - methylphenyl] - 2 - benzamidopropane-1,3-diol concentrated to a volume of about 150 cc. and an equal volume of hot water added to the hot solution. After allowing the solution to stand at 0° C. for about twenty-four hours, the crystalline [dl]-ψ-1-[2'-methylphenyl]-2-benzamidopropane-1,3-diol is collected and purified by recrystallization from methanol. Its formula is,

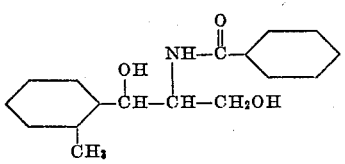

[dl]-ψ Form

The filtrate from which the [dl]-ψ isomer has been separated is evaporated to dryness and the residue taken up and fractionally crystallized from methanol to obtain the desired [dl]-reg.-1-[2'- methylphenyl] - 2 - benzamidopropane - 1,3-diol of formula,

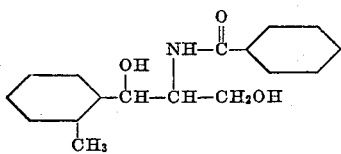

[dl]-Reg. form

Some of the subject matter disclosed but not claimed herein, is disclosed and claimed in our copending applications filed on even date herewith, Serial Nos. 76,172, 76,174, 76,175, 76,176, 76,177 (now Patent No. 2,514,376), 76,178 (now Patent No. 2,514,377), 76,179 (now Patent No. 2,483,885) and 76,180, and in the copending application of Loren M. Long, Serial No. 117,711, filed September 24, 1949.

What we claim is:

1. A compound of the class consisting of an amino diol and its acid addition salts, said amino diol having the formula,

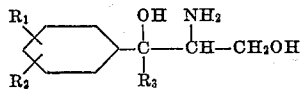

where $R_1$ and $R_2$ are members of the class consisting of hydrogen, halogen, lower alkyl and lower alkoxy radicals and $R_3$ is a member of the class consisting of hydrogen and lower alkyl radicals.

2. A compound of the class consisting of an amino diol and its acid addition salts, said amino diol having the formula,

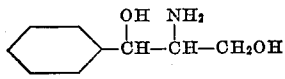

3. A compound of the formula,

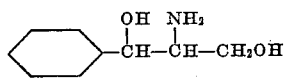

4. A compound of the formula,

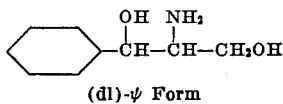

(dl)-ψ Form

5. A compound of the class consisting of an amino diol and its acid addition salts, said amino diol having the formula,

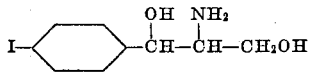

6. A compound of the formula,

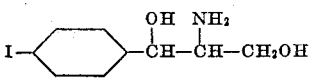

7. A compound of the formula,

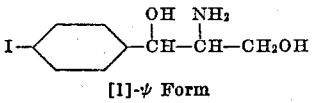

[l]-ψ Form

8. A compound of the class consisting of an amino diol and its acid addition salts, said amino diol having the formula,

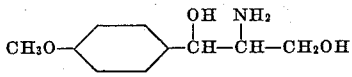

9. A compound of the formula,

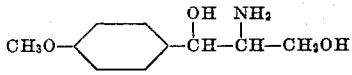

10. A compound of the formula,

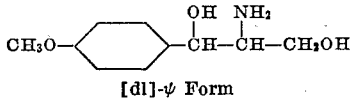

[dl]-ψ Form

HARRY M. CROOKS, Jr.
MILDRED C. REBSTOCK.
JOHN CONTROULIS.
QUENTIN R. BARTZ.

REFERENCES CITED

The following references are of record in the file of this patent:

UNITED STATES PATENTS

| Number | Name | Date |
|---|---|---|
| 2,103,266 | Lott | Dec. 28, 1937 |
| 2,363,465 | Senkus | Nov. 21, 1944 |

OTHER REFERENCES

Cherbuliez et al.: "Chemical Abstracts," vol. 25, p. 2132 (1931).

Degering: "Organic Nitrogen Cpds.," (Univ. Lithoprinters, Ypsilanti, Mich., 1945), pp. 409, 410, 205.